April 7, 1931.  C. MUZYN  1,799,923
STORAGE APPARATUS
Filed March 14, 1927   4 Sheets-Sheet 1
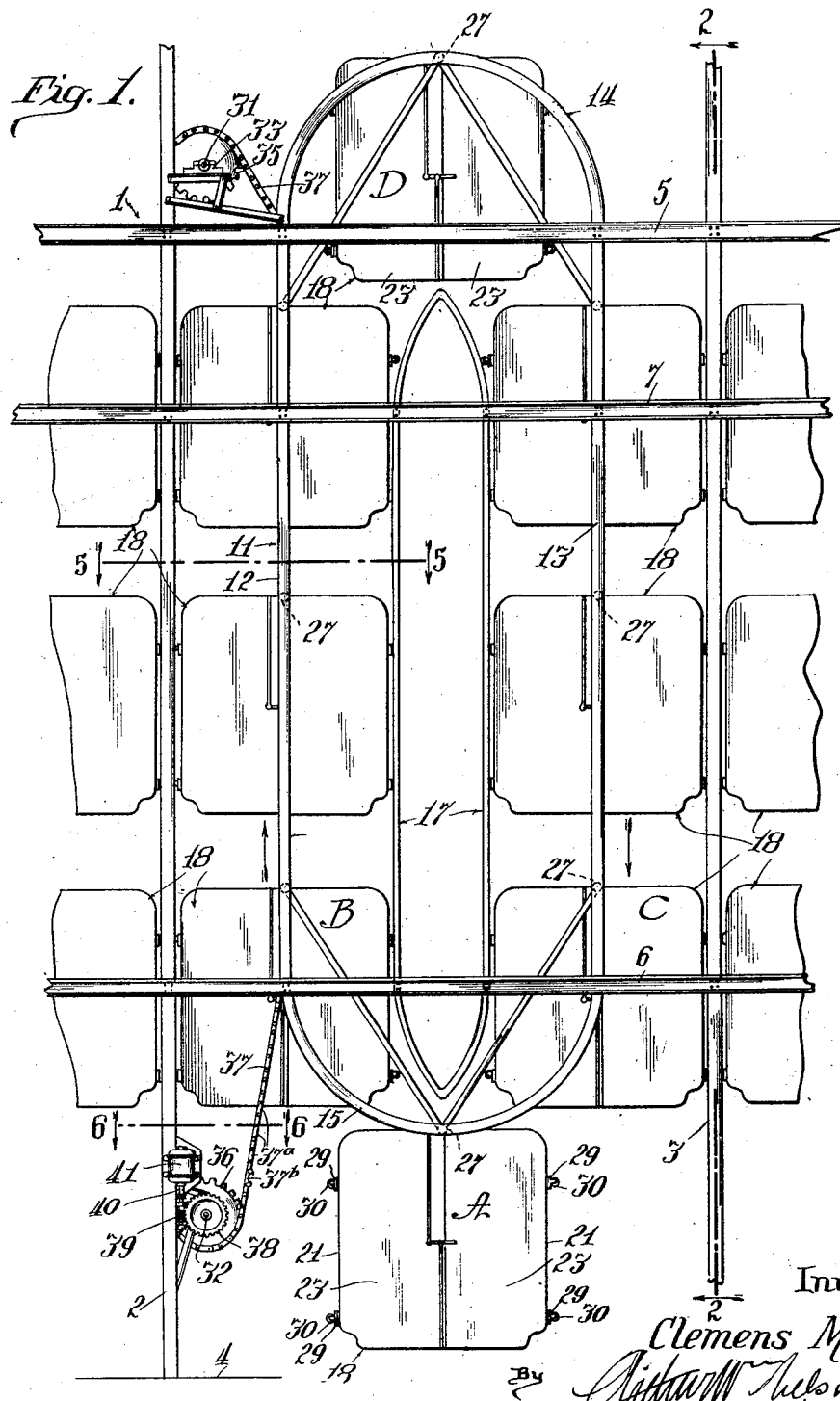
Inventor
Clemens Muzyn
By
Attorney

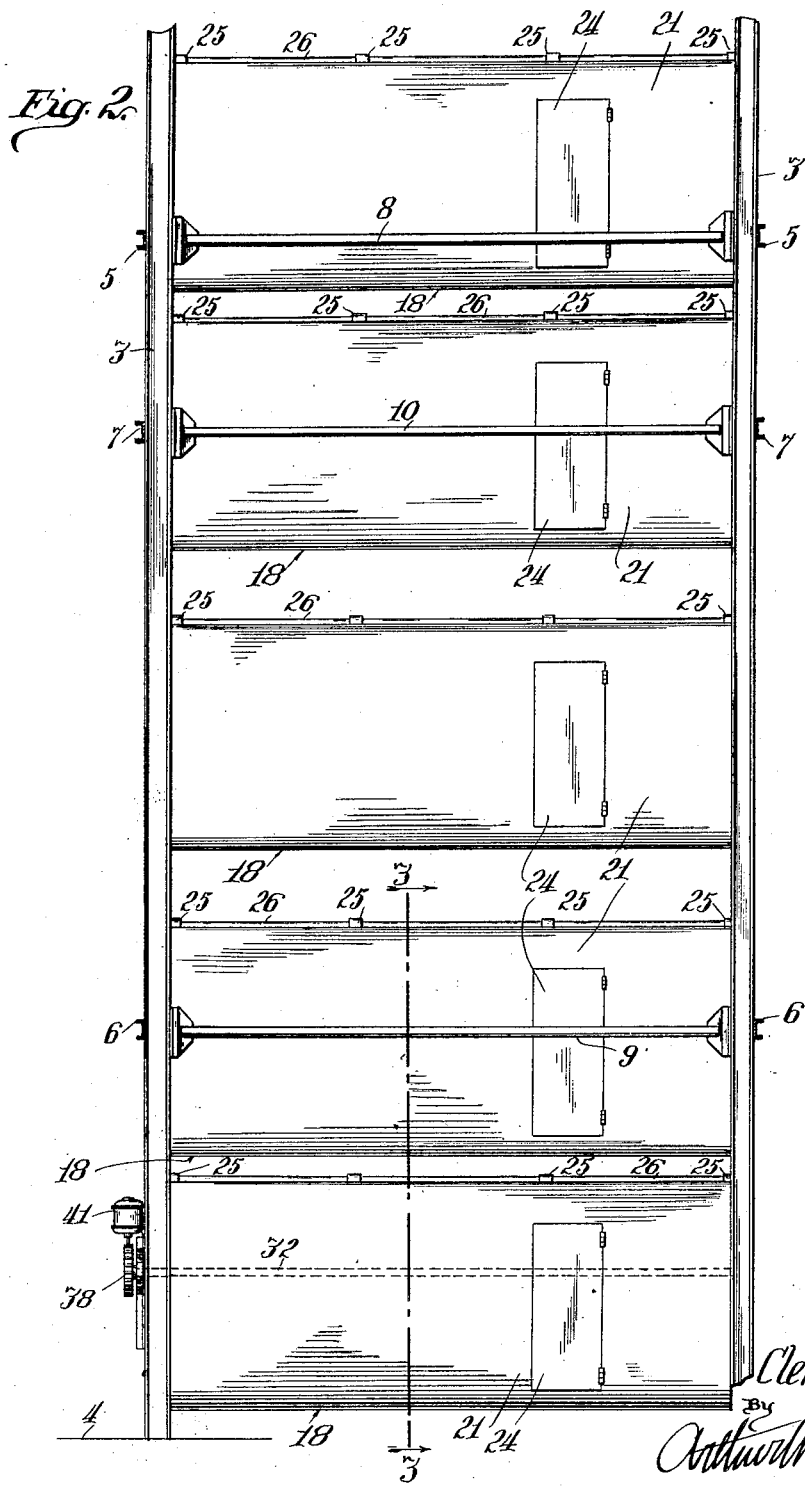

April 7, 1931.                 C. MUZYN                    1,799,923
                           STORAGE APPARATUS
                     Filed March 14, 1927    4 Sheets-Sheet 3
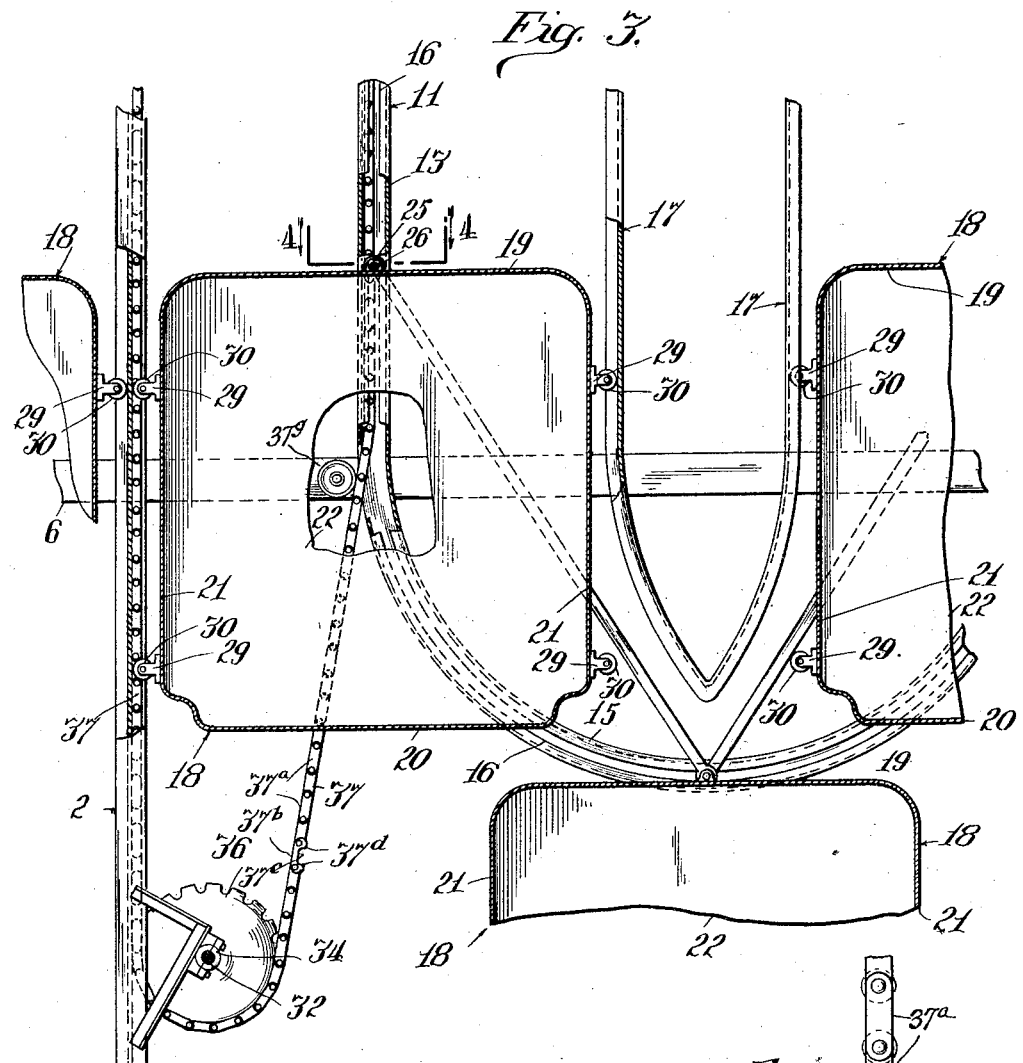
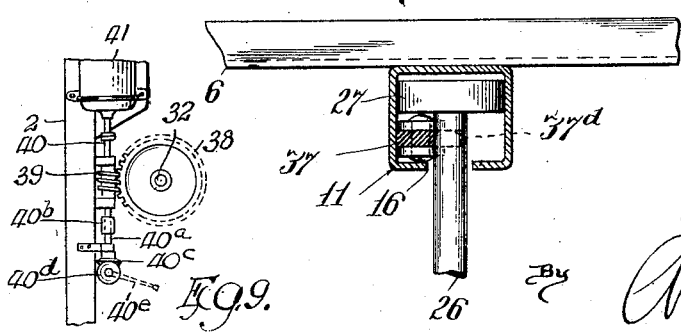
Inventor
Clemens Muzyn April 7, 1931.  C. MUZYN  1,799,923
STORAGE APPARATUS
Filed March 14, 1927  4 Sheets-Sheet 4
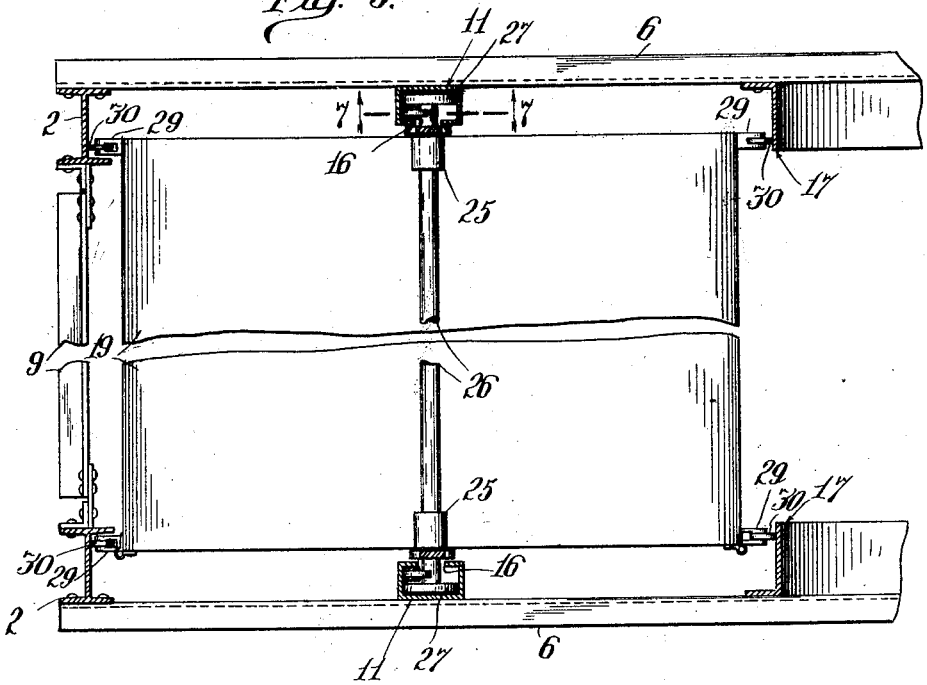
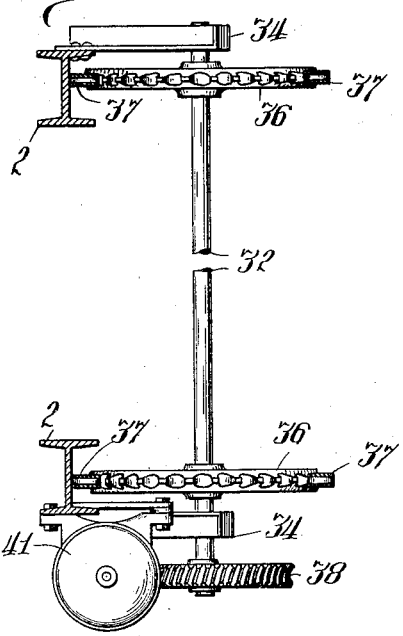
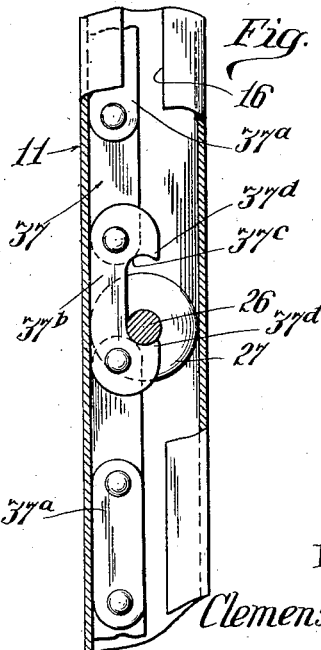
Inventor
Clemens Muzyn
By
Attorney Patented Apr. 7, 1931

1,799,923

UNITED STATES PATENT OFFICE

CLEMENS MUZYN, OF GARY, INDIANA

STORAGE APPARATUS

Application filed March 14, 1927. Serial No. 175,291.

This invention relates to improvements in storage apparatus and it consists of the matters hereinafter described and more particularly pointed out in the appended claims.

The primary object of the invention is to provide an apparatus especially adapted for the storage of automobiles, and the like, in public garages which though occupying a minimum of floor space will have a maximum storage capacity.

A further object of the invention is to provide such an apparatus whereby automobiles may be quickly placed in and released from temporary storage, without delay and without the congestion usually attendant to such operation as is found in public garages at the present time.

Still another object of the invention is to provide such an apparatus in the form of an endless conveyor which includes a plurality of individual storage containers or cages, any one of which may be readily brought into position with respect to an associated loading or unloading ramp in the garage building, in which my improved apparatus is installed.

Still another object of the invention is to provide such an apparatus, which includes a plurality of storage containers, into and from which an automobile may be readily driven, when the container is in operative position with respect to the loading and unloading ramp and wherein each container has doors through which the automobile may enter and leave, and another door through which the operator may enter and leave the container.

These objects of the invention as well as others together with the many advantages thereof will more fully appear as I proceed with my specification.

In the drawings:

Fig. 1 is a view in front elevation of a storage apparatus embodying one form of my invention as when providing one of a plurality of units of such apparatus installed in a garage building for the storage of automobiles.

Fig. 2 is a view in side elevation of said unit as when viewed in the direction of the arrows associated with the line 2—2 of Fig. 1.

Fig. 3 is a vertical detail section on an enlarged scale as taken on the line 3—3 of Fig. 2.

Fig. 4 is a detail horizontal sectional view on a further enlarged scale as taken on the line 4—4 of Fig. 3.

Fig. 5 is a horizontal detail sectional view as taken on the line 5—5 of Fig. 1.

Fig. 6 is another horizontal sectional view as taken on the line 6—6 of Fig. 1.

Fig. 7 is a vertical detail sectional view as taken on the line 7—7 of Fig. 5.

Fig. 8 is a detail view in elevation of a modified form of drive chain which may be employed in my improved apparatus and which will be more fully referred to later.

Fig. 9 is a view in elevation of a modified means for imparting movement to the drive chain and which will be more fully referred to later.

In general, my improved apparatus which will be described as employed in the storage of automobiles in public garages, includes a skeleton frame work of structural members arranged in a manner to provide adjoining upright storage units or sections. Each section embodies an endless travelling plurality of containers or cages each adapted to hold an automobile and each adapted to be brought at will into the desired position with respect to a loading and unloading ramp arranged on the floor of the garage. When the proper cage or container is brought into position with respect to the ramp, the entrance doors of the cage are opened and the automobile is driven thereinto under its own power and the door is closed. A second door is provided in the cage for the exit of the driver after which the mechanism of the apparatus is set in motion and the cage moves away from the ramp into storage position and another cage takes its place either to receive another automobile or to permit the removal of the one it contains.

Referring now in detail to that embodiment of the invention illustrated in the accompanying drawing, 1 indicates as a whole a portion of the structural frame work associated with one of a plurality of units or sections of my improved storage apparatus. Said structural frame work includes pairs of upright front and rear structural members in the form of I beams 2 and 3 respectively, all suitably anchored at their bottom ends in the cement floor 4 of a garage building. Said I beams are spaced the desired lateral distance apart and are arranged with the flanges of the beams of one pair facing those of the other pair. The beams of each pair of frames are connected together and to the like beams of adjacent units by top, bottom and intermediate channels 5, 6, and 7 respectively, as best shown in Figs. 1 and 2. The beams of the front pair are connected to the corresponding beams of the rear pair by top, bottom and intermediate members 8, 9 and 10 respectively made of angle bars arranged in the planes of the webs of the I beams of said pairs of upright members. The structural members just mentioned provide a portion of a skeletonized frame upon which the other members of the apparatus are mounted as will now be described.

11—11 indicates front and rear upright endless tracks, each arranged in the planes of the I beams of the front and rear pairs of upright members. Each track comprises upright side portions 12 and 13 respectively, each spaced an equal distance from an adjacent upright member and the top ends of said side portions are connected together by a semi-circular top portion 14 while the bottom ends of said side portions are connected together by a similar semi-circular bottom portion 15. The various portions thus described provide an upright disposed endless track. Each portion of the track members 11 is of a box like cross section as best shown in Fig. 5 with a centrally disposed slot 16 therein, the slot in one track member facing the slot in the other track member.

Within each track member is a guide comprising laterally spaced upright angle bars 17 which are fixed to the bottom and intermediate channels 6 and 7 respectively. The top and bottom ends of said bars 17 taper toward each other and the bottom end is spaced closer to the semi-circular bottom 15 of the track member 11 than is the top end with respect to the semi-circular top 14 of said track member. The upright angle bars 17 are spaced from the track portions 12 and 13 a distance substantially equalling the distance between said track portions and the upright beams 2 and 3 for a purpose to soon appear.

Associated with the front and rear tracks 11—11 in a plurality of containers or cages 18, each of a size to receive an automobile. Each container as shown herein is substantially box like and is of a height substantially equal to its width and is of a length or depth greater than its height or width. Each container which is open at one end, comprises a top wall 19, a bottom wall 20, side walls 21 and a rear wall 22, and associated with the open front end is a pair of swinging doors 23. In one side wall 21, nearer the rear wall of the container than the front, is a second door 24. Preferably the bottom wall is of peculiar construction in that it is formed with lateral curbs or guides 22a which are spaced apart a distance to guide the wheels of the automobile driven thereinto and to prevent any lateral shifting of the automobile after the same has been driven thereunto. This construction thus centralizes the automobile for an equal distribution of its weight so that the container which is suspended from above in a manner soon to appear, cannot tilt or sway to one side or the other as the container is thereafter moved into storage position. On the top wall of each container along its median line is a plurality of upright bearing ears 25 only the end bearing ears being best shown in Fig. 5. Journalled in said ears is a shaft 26 the ends of which extend through the slots 16 and into the box like channels forming the front and rear tracks 11—11. On the ends of each shaft is journaled a roller 27 of a diameter substantially equalling the interior diameter of said channels. The shaft of one container is connected at each end to the shafts of the adjacent containers by means of links 28 which are preferably arranged in the plane between the ends of said containers and box like channel constituting the track 11. Thus the links which space the containers apart, together with the shafts may be likened to an endless chain movable in a guided endless path defined by the tracks 11. On each side wall of each container near the ends thereof are laterally extending brackets 29 in each of which is journalled a roller 30, which rollers are adapted to have a rolling engagement with the webs of the upright beams 2—3 and with the opposed flanges of the upright guide members 17—17.

Means are provided by which movement is imparted to the connected containers and such means are as follows. Associated with the front and rear uprights 2—2 are top and bottom horizontal shafts 31—32 extending parallel with the shafts 26 of the containers or cages. The top shaft 31 is journalled in bearings 33 suitably supported from said uprights 2—2 while the bottom shaft is likewise journalled in similar bearings 34 suitably supported from said uprights. On each shaft is fixed, in the planes of the box channels of the track 11, pairs of front and rear sprockets 35 and 36 respectively. Trained about the front sprockets and the rear sprockets respectively on each shaft is a link chain 37, having such a sufficient slack therein as to permit one of the laps thereof to pass from the sprockets into and out of the box like channel of the portion 12 of the track, portions of the sides of said channels being cut away as is well understood to permit the chains to so enter and leave said channels. On the bottom shaft 32 forwardly of the front sprocket 35 thereon is fixed a worm gear 38 with which meshes a worm 39 fixed to a short upright shaft 40 journalled in suitable bearings on the upright member 2 adjacent the worm gear. This upright shaft is connected to the armature shaft of an electric motor 41 also suitably supported on said upright member. The chains 37 as best shown in Fig. 7 each comprise interconnected links 37a and interposed at predetermined intervals in the chain are special hook links 37b each having in one margin a recess 37c defining opposed top and bottom hooks 37d. When said links enter the box like channel of the track 12 the bottom hook 37d will engage the associated end of a shaft 26 adjacent a roller 27 and will pick up said shaft and move it upwardly in the track part 12. Of course this "pick up" of the shaft 26 occurs when the chains enter the bottom of the upright part of the tracks 12 and said shaft leaves the said link at the top end of said upright track part 12 which is at the beginning of the curved track portions 14.

The chains 37 may be provided with rollers 37y one on each pintle connecting the various links, which rollers will render the chains more easy running in these portions of the tracks 11 in which they engage. To prevent the binding of the chains where they enter and leave the associated portions of the tracks 11—11, I provide antifriction guide rolls 37g on the members 5 and 6 respectively and over which said chains are trained, only one of said rolls being shown in Fig. 3.

The operation of the apparatus is as follows: Assume that the parts are in the position shown in Fig. 1 wherein one of the containers marked "A" is at the bottom-most position in the apparatus. As best shown in said Fig. 1, the bottom wall or floor of the container is located a short distance above the floor 4 of the garage. On said floor may be placed a suitable ramp or inclined plane whereby after the doors 23 of said container "A" are opened, an automobile may be driven up into the said container. When the automobile is in the container, the operator of the automobile may leave the container through the door 24 thereof which is placed conveniently in position with respect to the door of the automobile when the same is within said container.

The doors 23 which have suitable locking mechanism are then closed and locked, after which the motor 41 is started. This causes a movement of the chains 37 whereby all the containers move simultaneously, those engaged with the track portions 12 moving upwardly and those engaged with the track portions 13 moving downwardly as indicated by the arrows in Fig. 1. The container "A" is thus moved in the position formerly occupied by the container marked "B" while the container marked "C" moves into the position formerly occupied by the container "A", and ready to either take an automobile or discharge one by backing the same out of the container. As the container marked "A" sweeps around the upwardly curved portion of track parts 15, the rollers 30 on the right hand side thereof engage the guides 17 and the rollers 30 on the left hand side thereof engage the webs of the left hand uprights 2—2 so that they are held against swinging or swaying under the action of the automobile therein.

Should the owner of the automobile stored in the topmost container marked "D" desire to withdraw his automobile therefrom, the motor 41 would be started and run until the said container would occupy the position of the container marked "A". When all the containers are occupied, those travelling downwardly will act to counterbalance those travelling upwardly so that there is no great starting torque imposed upon the motor which therefore may be a substantially small one.

In connection with the driving motor 41 I may employ a manual drive best shown in Fig. 9. In this instance I provide an extension 40a for the shaft 41 and which may be operatively connected thereto and disconnected therefrom by a suitable clutch 40b. On the bottom end of the shaft extension is a bevel pinion 40c engaged by a second and like pinion 40a to which a crank handle 40e is connected for turning the same. With this manual drive, the desired portion of the container A may be accurately attained.

By means of the worm gear drive, the chains 37 are locked when the motor is stopped so that there is no chance of the weight produced by the filled containers acting to make the chain move in a reverse direction. By means of my improved apparatus, it is possible to make use of all available space in a garage and therefore more automobiles may be stored in garages having limited floor space. This is apparent in Fig. 1 where a complete storage unit or section is illustrated in the position it occupies with respect to adjacent units or sections.

While in describing my invention, I have referred to many details of construction as well as form and arrangement of the parts thereof, the same is to be considered as by way of illustration only, so that I do not wish to be limited thereto except as may be pointed out in the appended claims.

I claim as my invention:

1. An apparatus of the kind described embodying therein upright parallel structural members arranged in front and rear pairs, means securing said members in the desired spaced relation, an endless track arranged in the planes of the members of each pair of structural members and supported by said means and including upright side portions and curved top and bottom portions, guides arranged between said track members, a plurality of shafts adapted for movement in spaced relation about said track members, a container suspended from each shaft and anti-friction rollers carried by each container and engaging said upright structural members and guides for holding the containers against swaying when travelling along the straight portion of said tracks.

2. An apparatus of the kind described embodying therein, parallel structural members arranged in front and rear pairs, means securing said members in the desired spaced relation, an endless track arranged in the planes of the members of each pair of structural members and supported by said means, and including upright side portions and curved end portions of box like channel cross section, a plurality of shafts adapted for movement in spaced relation about said track members, a container suspended from each shaft, an endless actuating chain having a part of said track portions and having devices incorporated therein to engage said shaft ends and means connecting the containers together.

3. In an apparatus of the kind described, a container open at one end and including top, bottom and side walls, and an end wall, doors for closing the opening end of said container, the bottom wall having parts arranged to guide the wheels of an automobile driven thereinto and a second door in one of said walls.

4. An apparatus of the kind described embodying upright parallel structural members arranged in front and rear pairs with the flanges of one pair facing those of the other pair, means securing said members in the desired spaced relation, an endless track arranged in the planes of the members of each pair of structural members and supported by said means and including upright side portions, curved top and bottom portions, guides arranged between said track members, a plurality of shafts adapted for movement in spaced relation about said track members, a container suspended from each shaft and rollers carried by each container and engaging said upright structural members and guides for holding the containers against swaying when traveling along the straight portions of said track.

5. An apparatus of the kind described embodying therein parallel structural members arranged in front and rear pairs, means for securing said members in desired spaced relation, an endless track arranged in the planes of the members of each pair of structural members and supported by said means and including upright side portions and curved end portions of box like channel cross section, a plurality of shafts adapted for movement in spaced relation about said track members, a container suspended from each shaft, an endless actuating chain having a part of its length disposed in one of said track portions, upper and lower sprockets over which said chain travels, operating means for said sprockets, and spaced hooks on said chain for engaging said shaft ends.

6. An apparatus of the kind described embodying therein parallel structural members arranged in front and rear pairs, means securing said members in the desired spaced relation, an endless track arranged in the planes of the members of each pair of structural members and supported by said means and including upright side portions and curved upper and lower end portions, guides arranged between the upright side portions of the track with their ends spaced from the curved portions of the track thus providing an endless path for containers, a plurality of shafts adaptable for movement in spaced relation about said track members, a container secured to each shaft, an endless actuating chain having a part of its length disposed in one of said track portions, the part of the chain in said track portions adapted to travel upwardly, upper and lower sprockets over which said chain travels, operating means for said sprockets, spaced hooks on said chain for engaging said shaft ends, and connecting links between the containers.

7. An apparatus of the kind described embodying therein opposing endless track members disposed in vertical relation, means for supporting said track members in such vertical relation, a plurality of containers, devices mounted on said containers and engaging said track members, endless chains traveling along one vertical side of each endless track member, worm gearing in operative relation with the endless chain, a drive shaft for the worm gearing, a motor for operating the drive shaft, manual means for operating the drive shaft, and clutch members for disconnecting either of the operating means for the drive shaft when desired.

In testimony whereof, I have hereunto set my hand, this 10th day of March, 1927.

CLEMENS MUZYN.